(12) United States Patent
Giallorenzi et al.

(10) Patent No.: US 7,609,751 B1
(45) Date of Patent: Oct. 27, 2009

(54) METHOD AND APPARATUS TO INITIATE COMMUNICATIONS BETWEEN AN UNKNOWN NODE AND AN EXISTING SECURE NETWORK

(75) Inventors: Thomas R. Giallorenzi, Riverton, UT (US); Johnny M. Harris, Centerville, UT (US); Eric K. Hall, Holliday, UT (US); Richard B. Ertel, Midvale, UT (US); Dan M. Griffin, Bountiful, UT (US)

(73) Assignee: L-3 Communications Corporation, New York, NY (US)

( * ) Notice: Subject to any disclaimer, the term of this patent is extended or adjusted under 35 U.S.C. 154(b) by 739 days.

(21) Appl. No.: 11/136,783

(22) Filed: May 24, 2005

(51) Int. Cl.
*H04B 1/00* (2006.01)

(52) U.S. Cl. .......... 375/142; 375/140; 375/141; 375/143; 375/145; 375/146; 375/295; 375/354; 375/357; 375/359; 375/367

(58) Field of Classification Search .......... 375/140, 375/141, 142, 143, 145, 146, 295, 354, 357, 375/359, 367, 368, 370
See application file for complete search history.

(56) References Cited

U.S. PATENT DOCUMENTS

| | | | | |
|---|---|---|---|---|
| 4,442,412 | A * | 4/1984 | Smith et al. | 331/1 A |
| 5,121,138 | A * | 6/1992 | Schermer et al. | 347/250 |
| 5,128,957 | A * | 7/1992 | Nakagawa | 375/142 |
| 5,278,862 | A * | 1/1994 | Vander Mey | 375/139 |
| 5,598,154 | A * | 1/1997 | Wilson et al. | 341/50 |
| 6,044,074 | A | 3/2000 | Zehavi et al. | 370/350 |
| 6,163,533 | A * | 12/2000 | Esmailzadeh et al. | 370/342 |
| 6,396,866 | B1 * | 5/2002 | Upton et al. | 375/139 |
| 6,628,697 | B1 * | 9/2003 | Douglas et al. | 375/139 |
| 6,728,225 | B1 | 4/2004 | Ozluturk | 370/320 |
| 6,754,195 | B2 | 6/2004 | Webster et al. | 370/335 |
| 6,985,749 | B2 * | 1/2006 | Bannasch et al. | 455/506 |
| 7,065,373 | B2 | 6/2006 | Rodgers et al. | 455/502 |
| 2002/0073223 | A1 | 6/2002 | Darnell et al. | 709/232 |
| 2002/0085716 | A1 * | 7/2002 | Abdulkader | 380/205 |
| 2003/0112851 | A1 * | 6/2003 | Aust et al. | 375/141 |

(Continued)

OTHER PUBLICATIONS

Yao, Y., et al., "A Two-Layer Spreading Code Scheme for Dual-Rate DS-CDMA Systems", IEEE Transactions on Communications, vol. 51, No. 6, Jun. 2003, p. 873-879.

*Primary Examiner*—Chieh M Fan
*Assistant Examiner*—Siu M Lee
(74) *Attorney, Agent, or Firm*—Harrington & Smith, PC

(57) ABSTRACT

A first node initiating communications with a second node already in a secure network sends a discovery burst having a preamble portion and a payload portion. The preamble portion is sent at a varying frequency between high and low thresholds that are reflective of Doppler uncertainty between the nodes. The second node continuously listens at a frequency, termed an acquisition frequency. A data sequence in the preamble portion, known to the second node, is received and used to determine the receive instant in the preamble portion, and thereby compare against the known frequency ramp to determine the frequency at which the payload portion will be received. Preferably, the first node varies the preamble portion between thresholds more than once within the time span of a single preamble portion, and the preamble and payload portions are spread with different spreading codes. The preamble portion may also be disguised with noise generated by the first node.

20 Claims, 6 Drawing Sheets

U.S. PATENT DOCUMENTS

| | | | |
|---|---|---|---|
| 2004/0218533 A1 | 11/2004 | Kim et al. | 370/235 |
| 2005/0058121 A1 | 3/2005 | Santhoff et al. | 370/352 |
| 2005/0195770 A1 | 9/2005 | Baliga et al. | 370/335 |
| 2006/0172711 A1 | 8/2006 | King et al. | 455/101 |
| 2006/0227750 A1 | 10/2006 | Soltanian et al. | 370/335 |
| 2007/0092261 A1 | 4/2007 | Fan et al. | 398/158 |
| 2007/0211678 A1 | 9/2007 | Li et al. | 370/338 |

* cited by examiner

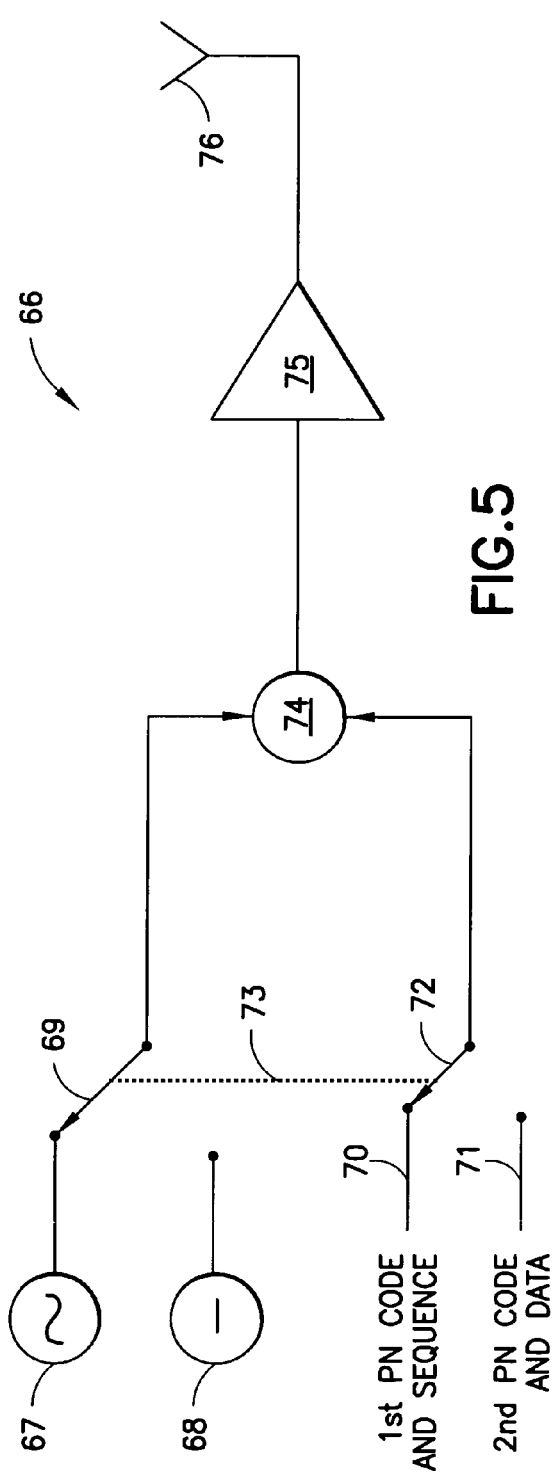
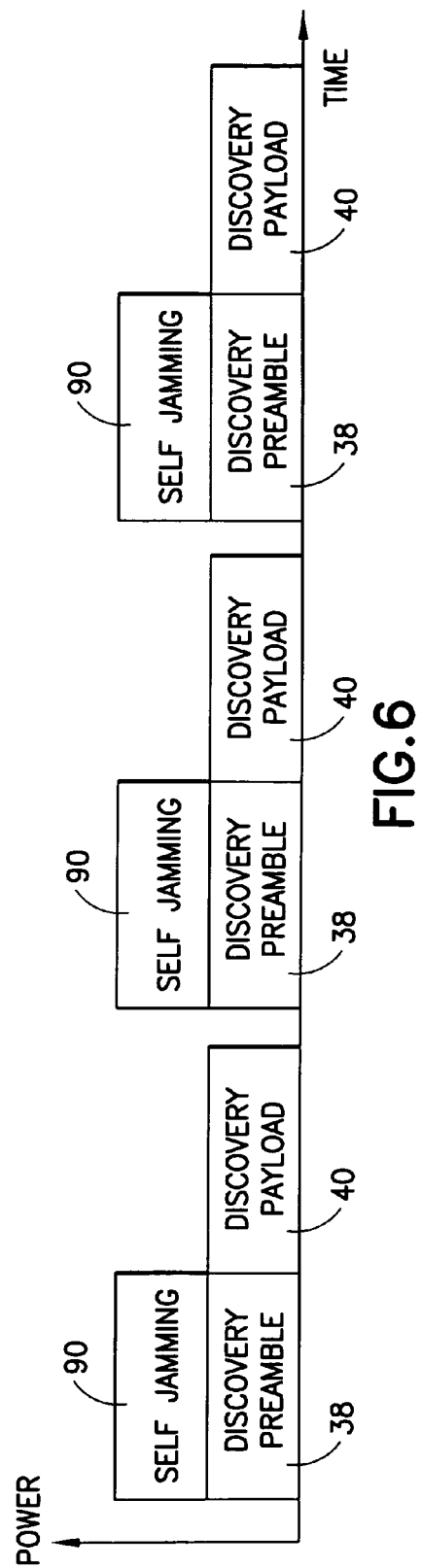

METHOD AND APPARATUS TO INITIATE COMMUNICATIONS BETWEEN AN UNKNOWN NODE AND AN EXISTING SECURE NETWORK

CROSS-REFERENCE TO RELATED APPLICATION

This application is related to co-owned U.S. patent application Ser. Nos. 11/136,943 11/136,782 and 11/136,789, filed the same date as this application. Those related applications are hereby incorporated by reference.

FIELD OF THE INVENTION

The present invention relates to signal acquisition, specifically, Doppler searches between a transmitter and receiver initiating contact with one another, which usually occur in a preamble of a transmission burst. It is particularly advantageous for spread spectrum communication systems.

BACKGROUND

In digital spread spectrum (DSS) communication, a wide band carrier signal is modulated by a narrow band message signal. The wide-band carrier is typically generated by modulating a single frequency carrier using a pseudo-random noise (P/N) code sequence. The data rate at which a message is communicated is usually much lower than the P/N code symbol or "chip" rate. The ability of DSS to suppress interference is proportional to a ratio of the chip rate to data rate. In many applications, there are thousands of code chips per data bit.

At the receiver, a carrier replica is generated by reducing the DSS signal to baseband and multiplying it with a locally generated replica of the original narrow-band carrier using a local oscillator. If the frequency and phase of the carrier replica is the same as that of the received original narrow-band carrier, then the multiplier output signal will be the product of the bipolar P/N code and intended message. The P/N code is removed by multiplying the wide-band data stream with the locally generated replica of the P/N code that is time aligned with the received P/N code. This is the despreading process.

Generating the carrier replica with proper carrier frequency and phase and generating the P/N code replica at the proper rate and time offset is a complex problem. In many DSS communication systems, the necessary carrier frequency, carrier phase, and P/N code offset are not known a priori at the receiver, which tries different values until a large signal is observed at the data-filter output. This is termed the search or acquisition process, and a DSS signal is said to be acquired when the proper frequency, phase, and code offset have been determined. A receiver selects and detects a particular transmitted signal by choosing the appropriate P/N code and performing the acquisition search. In some cases the acquisition search must include examination of different PIN codes from a known list when the transmitting node is not known, as is the likely scenario in FIG. 1. When many different codes, code offsets and carrier frequencies must be examined and the SNR is low, the acquisition task can be both time and energy consuming.

The above constraints are more pronounced in a secure environment such as that depicted in FIG. 1 (detailed below), where a new node termed a hailing node 34 seeks to join an existing network while maintaining security for the joining node and those nodes already on the network. In addition, an established network requires a method of discovering the existence of another separate network that may have migrated into communication range, so that a cross-link can be established between the networks in order to form a larger network. This process of nodes "discovering" each other is termed herein node discovery, and is where DSS signal acquisition occurs. Typically, node discovery is done on channels separate from the primary data communication channels. Limited data exchange on the 'discovery channel' is preferable for network optimization. As a result, the discovery waveform must be flexible in the messages it carries and not be constrained to one specific message type or size.

The air interface should consist of a flexible and symmetric full-duplex or half-duplex link. The transmitting node or hailing node is that node that sends a discovery burst, essentially a message inquiring as to the presence of receiving nodes. Receiving nodes are the nodes that listen for that discovery burst. The receiving nodes are therefore target nodes, which may already have formed a network. These receiving nodes may become transmitting nodes when they send an acknowledgement back to the initiating new node. In this way, a new node that flies into range of an established network will transmit burst discovery messages on that transmitting node's transmit link. When a receiving node in the established network hears the discovery message on its receive link, it will respond via its transmit link which is the hailing node's receiving link. Subsequent handshaking can then be performed via the two node's transmit and receive links to bring the initiating new node into the network. The transmitting and receiving links may occupy separate time slots in a time division duplex (TDD) system, or may be separate frequency bands in a frequency division duplex (FDD) system.

An exemplary but non-limiting environment in which node discovery may be important is illustrated in perspective view at FIG. 1, a prior art arrangement of disparate nodes operating in a traffic data network and one hailing node seeking to join the traffic network. The nodes may be airborne as in aircraft; terrestrial as in autos, trucks, and trains; or waterborne as in ships and other surface watercraft. They may be stationary or mobile, fast or slow moving, as for example, communications between nodes in a building, an aircraft, and an auto. For additional flexibility, it is assumed that a hailing node 34 may not have a clock signal synchronized with the network prior to joining. The range 22 of the traffic data network is centered on a command node 24, absent relays by other nodes within the network. Where the network links members via a satellite link, the line-of-sight range 22 is not particularly relevant. The range 22 is included to show further advantages of the invention that may be exploited when network communications are geographically limited.

The command node is representative of the node that receives the discovery burst, and may be a true command node that controls access to the secure network (in that no other nodes receive and acknowledge discovery bursts) or it may represent any node already established within the network that receives the discovery burst (such as where all established nodes listen for discovery bursts). In FIG. 1, all nodes depicted as within the traffic network range 22 communicate on the traffic network, either through the command node 24 or directly with one another once granted network entry. The traffic network typically operates by directional antennas 24a, at least at the command node 24, to maximize the network range 22. This is because directional antennas typically enable a higher antenna gain and a higher tolerable path loss as compared to omni-directional antennas. Therefore, a range (not shown) of a discovery network that operates using omni-directional antennas 24b is somewhat less, at least in the prior art. The command node 24 maintains communication with stationary nodes 26, 28. When two nodes are aircraft, they may be closing or separating from one another at very high rates, rendering Doppler effects significant. When a hailing node 34 sends a discovery burst to locate and request entry into the traffic network, its signal is typically not received at the command node 24 until the hailing node is within the traffic network range 22. Since the hailing node 34 is not yet identified as authorized, this potentially puts communications within the network at risk, or alternatively unduly delays granting the hailing node 34 access to the network. Because access to the traffic network is obtained through the discovery protocol, that protocol must exhibit security features to prevent compromise of the traffic network.

Considering the issues apparent in light of FIG. 1, a good node discovery scheme for a highly secure communications network would therefore exhibit (a) high speed and reliability; (b) long range; (c) low probability of intercept (LPI) and low probability of detection (LPD) by unauthorized parties; (d) universal discovery and recognition among the various nodes; (e) asynchronous discovery; and (f) reliability for both stationary and fast-moving nodes. Each of these aspects are detailed further at co-owned and co-pending U.S. patent application Ser. No. 10/915,777 (filed on Aug. 10, 2004), herein incorporated by reference in its entirety.

Transmission bursts are normally divided into preamble and payload sections, payload carrying the substantive data. In a discovery burst of the prior art, the preamble and payload sections were at the same frequency and the receiving node would search among the possible frequency bins until it acquired the burst preamble. This prior art approach has been described as the receiver spinning its frequency search. In Doppler environments where transmitter and receiver may move relative to one another at a rate unknown prior to acquisition, as with the hailing and command nodes of FIG. 1, the frequency at which a discovery burst reaches a receiver is unknown to the extent of Doppler uncertainty. Ensuring the prior art receiver locks onto a discovery burst payload within the very short time of that burst preamble (e.g., on the order of milliseconds) with a high degree of probability requires a large hardware commitment. The present invention uses a different discovery burst regimen to reduce the hardware requirement in the receiver while simultaneously decreasing acquisition time in a highly secure communication environment.

SUMMARY OF THE INVENTION

In accordance with one aspect, the present invention is a method for establishing communications between a first and a second communication node. The method includes transmitting a waveform from the first node towards the second node. The waveform has a preamble portion and a payload portion, and the preamble portion is transmitted with a carrier frequency that varies in a range of carrier frequencies. The preamble portion further has a data sequence known to a second node. Further in the method, the preamble portion is received at a reception instant at the second node and at an acquisition frequency that lies within the range of carrier frequencies. A value of the data sequence at the reception instant is correlated at least with an expected value of the carrier frequency during reception of the payload portion. For example, any Doppler uncertainty may be resolved by the second node determining where along a varying carrier frequency ramp the reception instant occurred. Where the frequency ramp and the carrier frequency of the payload portion are known to the second node, the second node may correct its reception frequency for the payload portion by applying a Doppler correction calculated from the payload portion.

In accordance with another aspect of the invention, a transmitter includes a first and second switch, a controller, a modulator, and at least one transmit antenna. The first switch operates to switch between a variable frequency generator and a substantially constant frequency generator by alternately coupling to one or the other of them. The second switch operates to switch between a first PN code input and a second PN code input by alternatively coupling to one or the other of them. The controller operates the first and second switches simultaneously. The modulator has an input coupled to an output of each of the first and second switches, and has an output coupled to an input of the at least one transmit antenna. Preferably, the variable frequency generator provides a carrier frequency that varies non-linearly in a range of carrier frequencies, and the varying carrier frequency crosses a particular frequency within the range at least twice while the first switch remains continuously coupled to the variable frequency generator. That the carrier frequency varies does not imply is must vary continuously; it may be stepped in discrete frequencies that vary from one another in a manner that approximates a linear or a specific non-linear continuous frequency ramp.

In accordance with another aspect, the invention is a transmitter for sending a discovery burst. The transmitter includes means for impressing a data sequence in a burst preamble, wherein each and every point of the data sequence is indicative of a unique position within the preamble. These means may be a digital counter or any number of number generators known in the art, or may be drawn from a memory of the transmitter. The data sequence may be sequential (as in a known sequence, not necessarily increasing or decreasing by one count with each data point), or each data point may be matched to a specific frequency or limited range of frequencies. The transmitter further has means for applying a variable frequency profile to the burst preamble and means for applying a constant frequency to a burst payload. These may be, respectively, variable and constant frequency generators as known in the art. The transmitter further has means for combining the burst preamble at the variable frequency and the burst payload at the constant frequency within a single discovery burst. These means may include a gate, a switch, or any of numerous apparatus known for combining signals from different inputs in a seriatim manner. The transmitter further has means for transmitting the discovery burst, which is preferably one or more transmit antennas.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

BRIEF DESCRIPTION OF THE DRAWINGS

The present invention is described below more particularly with reference to the following drawing figures, which are not to scale except where stipulated.

FIG. 5 is a block diagram of a transmitter according to the preferred embodiment of the present invention.

FIG. 6 is a graph of transmission power for the burst preamble and payload, and depicting an approach to improve security for the burst preamble.

DETAILED DESCRIPTION

Figure 1:
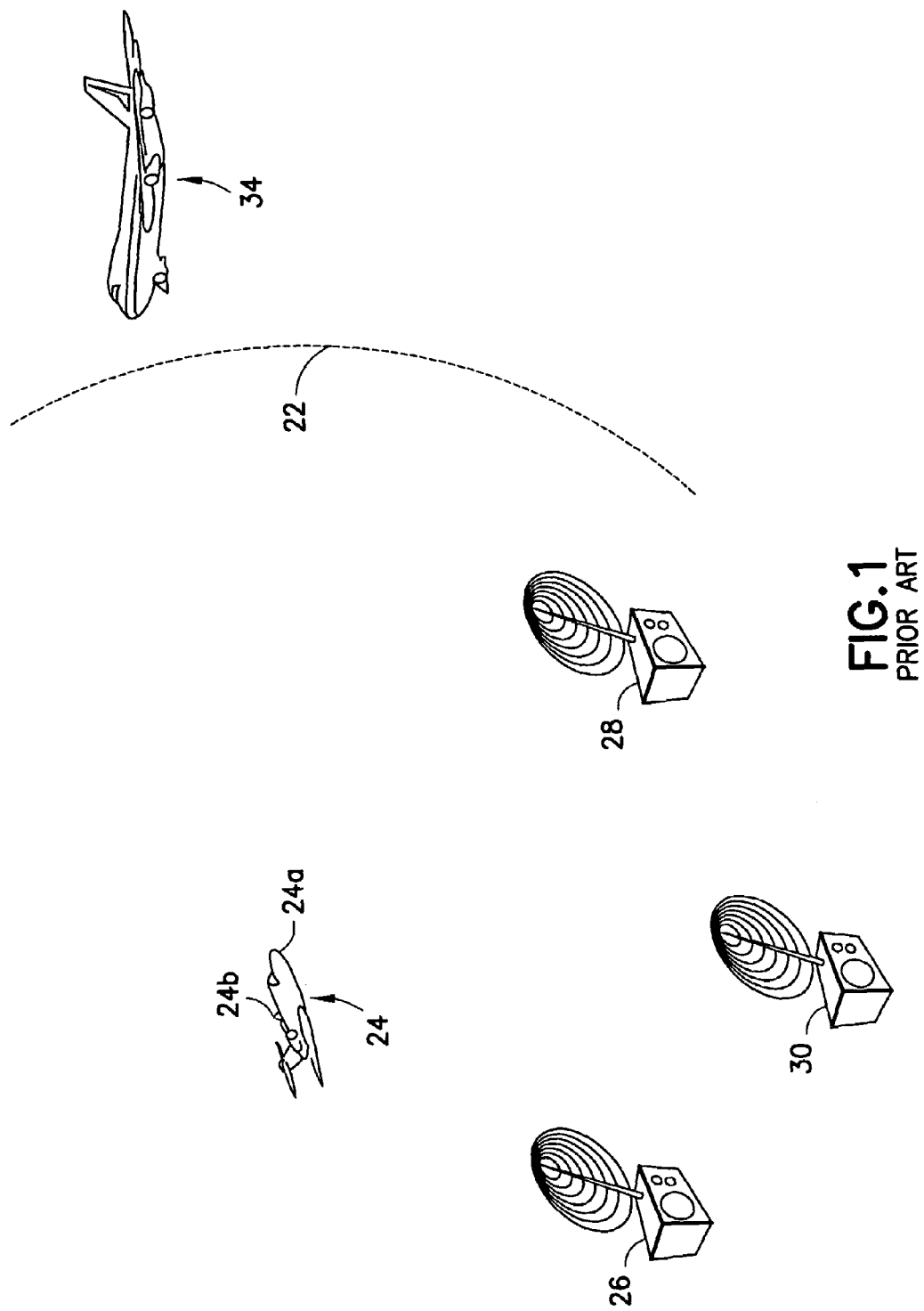
FIG. 1 is a schematic diagram of a particularly challenging prior art communication system in which a hailing node seeks entry into a communication network, and is an apt environment for the present invention.

Consider again FIG. 1. A hailing node 34 seeking entry into the network is unaware of the location of the command 24 or other nodes already communicating on the network. Communication on the traffic channels may be done with a very long P/N code for high security, but discovery of new nodes such as the hailing node 34 generally operate with less complex PN codes apart from traffic P/N codes to ensure security for the longer traffic codes. The present invention is particularly described in the context of a discovery protocol for a hailing node 34 to join the secure communications network of FIG. 1.

Figure 3A:
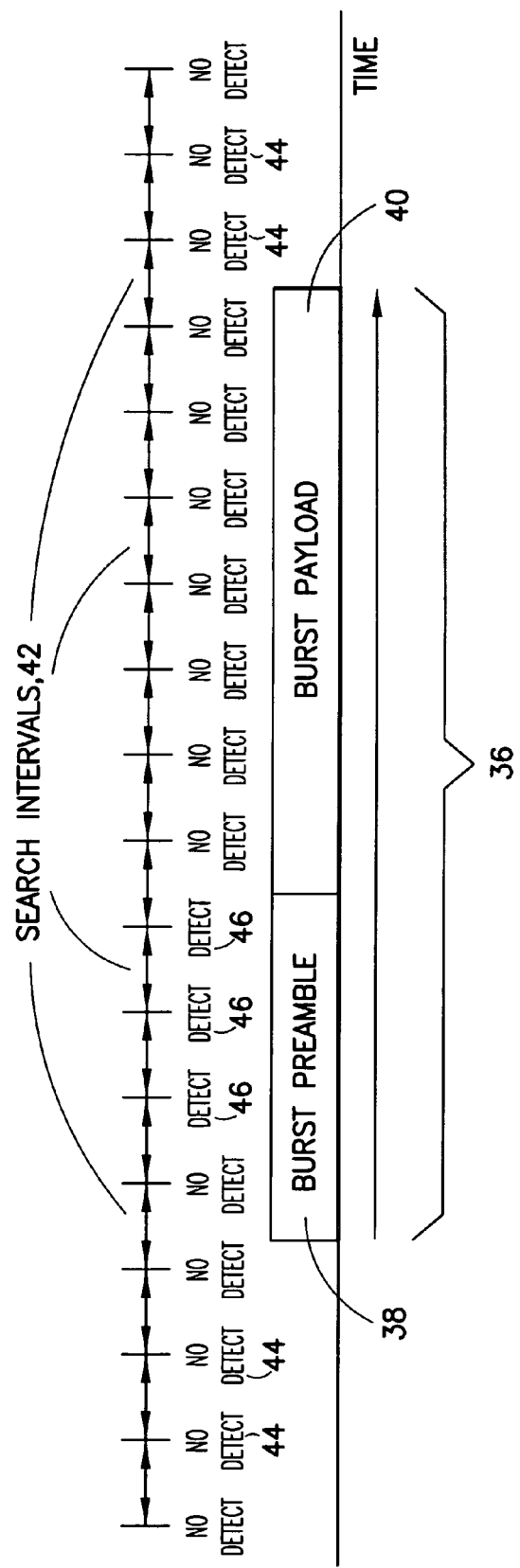
FIG. 3A is an overview of discovery search intervals by a command node of FIG. 1 plotted against a discovery burst by a hailing node of FIG. 1.
Figure 3B:
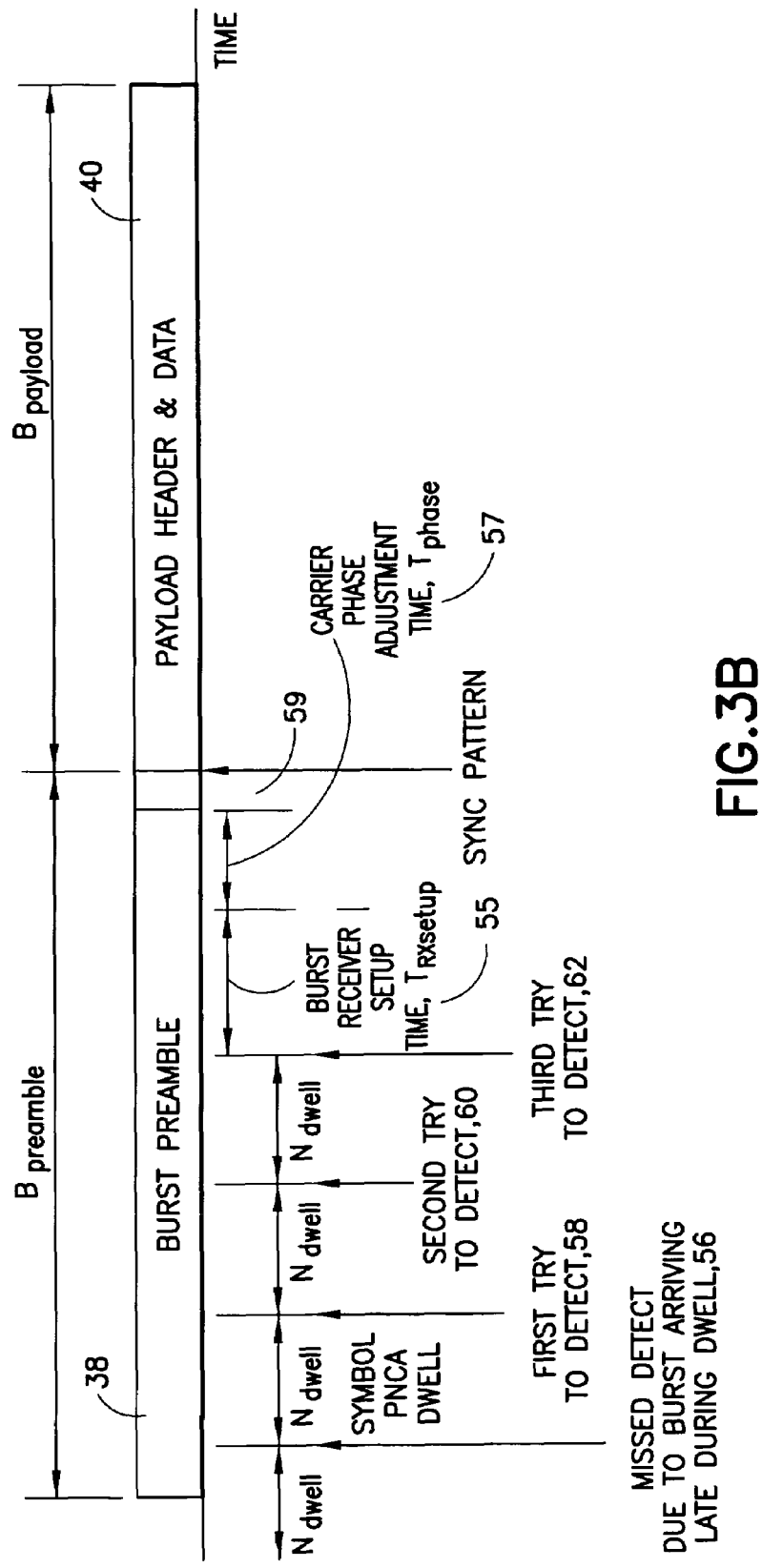
FIG. 3B is a detailed view of FIG. 3A showing response of the command node during the preamble of a discovery burst when the hailing node is not synchronized, in accordance with the preferred embodiment of the present invention.

As is typical, a discovery burst 36 waveform is divided by time into a burst preamble 38 portion and a consecutive burst payload 40 portion (see FIGS. 3A-3B). Security in the network of FIG. 1 is enhanced when a PN code used in a burst preamble 38 differs from that used in the burst payload 40. As compared to the prior art, the present invention shifts some complexity from the receiver of the command node 24 to the transmitter of the hailing node 34 by having the hailing node 34 transmit discovery bursts 36 at various frequencies, between a high threshold (maximum Doppler) and a low threshold (minimum Doppler) within the burst preamble 38, while the receiver of the command node 24 listens at an acquisition frequency between those thresholds. Since the complexity of spinning a signal at the transmitter in a regular way is potentially lower than performing bin searches at the receiver, overall system complexity is reduced. The command node 24 essentially 'parks' its receiver at an acquisition frequency awaits the discovery burst, which it detects at a reception instant. A known data sequence in the preamble 38 discloses to the command node 24 exactly where in the discovery burst preamble 38 the reception instant lays. From this, the command node 24 may calculate when the payload begins and set up one of several receivers to receive the payload 40 in time.

Figure 2A:
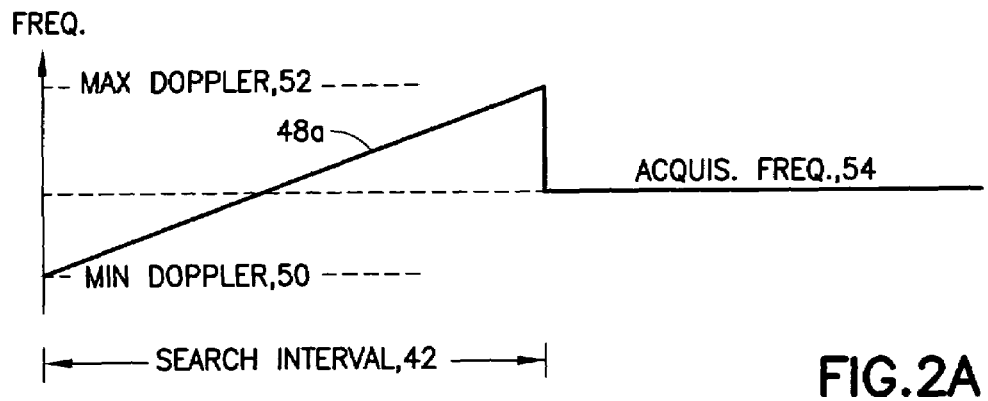
FIG. 2A is a profile of a frequency ramp over which the hailing node of FIG. 1 transmits the burst preamble according to an alternative embodiment of the present invention.

FIG. 2A is a graph showing a simple constant-ramp 48a frequency profile over which the hailing node 34 transmits the discovery burst 36. In general, the hailing node 34 transmits a burst preamble within each search interval 42 according to a variable frequency profile that varies between a high 52 and a low 50 threshold. The command node 24 may simultaneously listen among several frequencies in parallel receivers as detailed below to minimize instances of no receiver lock. Arbitrarily, the frequency profile is depicted as beginning at a minimum Doppler frequency 50 and continuing to a highest Doppler frequency 52. Given some knowledge of the maximum likely or absolute maximum speeds of platforms (e.g., aircraft, ship, etc.) that may define each of the various nodes in a network, the Doppler limits 50, 52 (the Doppler uncertainty) between unaware nodes are readily determined. An acquisition frequency 54 is that frequency between the minimum 50 and maximum 52 Doppler frequencies at which the command node 34 receiver detects and locks onto the burst preamble 38.

Figure 2B:
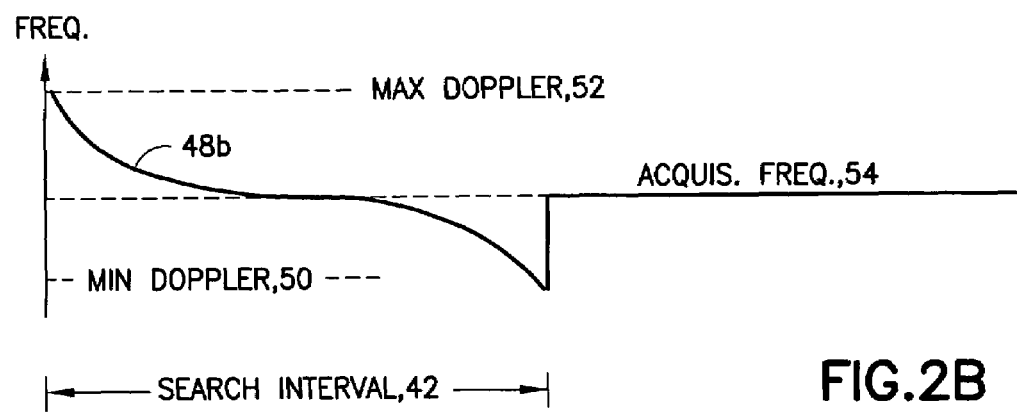
FIG. 2B is a profile of a frequency ramp over which the hailing node of FIG. 1 transmits the burst preamble according to the preferred embodiment of the present invention.

While the constant ramp 48a frequency spin of FIG. 2A provides for a simple description, the preferred embodiment uses a continuously variable rate ramp 48b such as that depicted in FIG. 2B. This takes advantage of the statistical probability that for two nodes 24, 34 unaware of the other's relative position or velocity, the probability curve that any particular frequency is the acquisition frequency describes a bell curve centered exactly between the min 50 and max 52 thresholds. The continuously variable rate ramp 48b of FIG. 2B approximately reflects that acquisition frequency probability curve, spinning frequency at a rate more slowly in the areas of highest probability (i.e., nearer the median frequency). Specifically, for a single burst preamble 38, the transmitter of the hailing node 34 begins transmitting at a threshold frequency and spins toward a median frequency at a decreasing rate. Upon reaching the median frequency, it spins toward the other threshold at an increasing rate. This ensures more time transmitting the burst preamble 38 near the median frequency, where statistically the acquisition frequency is more likely to be, and less time near the threshold frequencies where it is less likely. It is understood that the frequency ramp need not be analog and continuous, but may be digitally stepped and frequency-discontinuous to approximate an analog ramp.

Figure 2C:
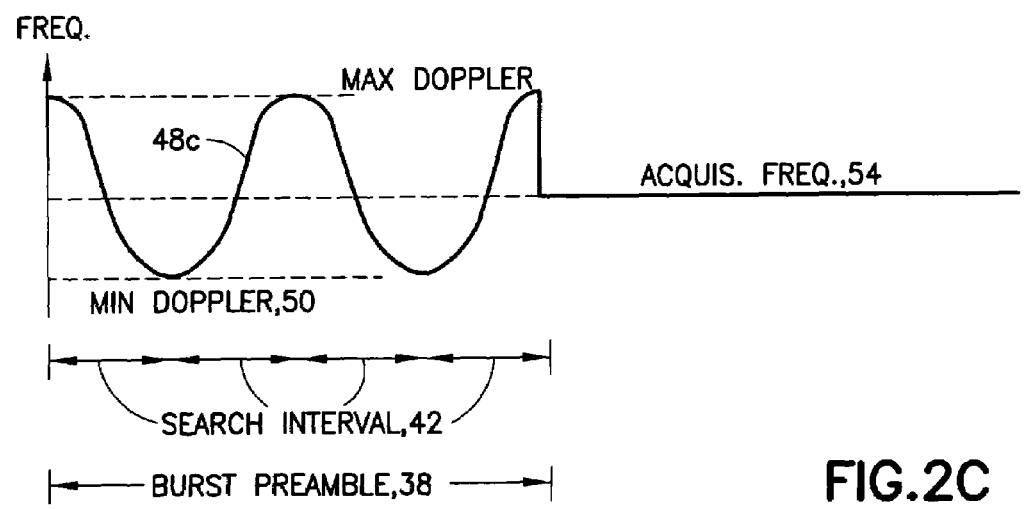
FIG. 2C is a profile of the frequency ramp of FIG. 2B, compressed in time within a search interval that is about one-fourth the duration of the burst preamble, with consecutive search intervals alternating the direction of the frequency ramps.

FIG. 2C illustrates that the frequency ramp of FIG. 2B is compressed within a search interval 42 that is less in time than the entire burst preamble 38. The frequency ramp is reversed in direction for each consecutive search interval within the burst preamble, allowing multiple crossings of the acquisition frequency 52 (which is unknown to the transmitting node) and more opportunities for the potential receiver to detect the discovery preamble 38 in time to set up and receive the burst payload 40.

The content of the burst preamble is now described. The data pattern sent during the preamble 38 is preferably a simple countdown, or it may be a pseudo-random pattern known in advance to the command node 24. In either case, each data bit or symbol denotes a position within the preamble 38 (either in time or along a known frequency ramp) that makes it possible for the command node 24 to resolve its Doppler frequency uncertainty and location in the preamble as soon as lock has occurred. For example, assume the frequency varies among four frequency steps: 900 MHz, 1100 MHz, 1300 MHz, and 1500 MHz. One possible data sequence embedded within the burst preamble 38 would include four unique symbols, for example, 00 representing 900 MHz, 01 representing 1100 MHz, 10 representing 1300 MHz, and 11 representing 1500 MHz. As the data sequence is already known to the command node 24 (as well as the profile of the frequency ramp), it then knows where along the frequency ramp the preamble 38 was when received, and may then set-up and tune a receiver to meet the frequency of the preamble 38 anywhere else along the frequency ramp. Where the preamble 38 uses a different PN code than the payload 40, the preamble preferably also contains some information to inform the receiver of the command node 24 what the PN code of the payload may be (e.g., symbols indicating which constituent sub-codes the payload PN code is made from and/or in what order they are combined, and perhaps an indication of phase, a time that the payload PN information becomes valid, and any necessary encryption. Where the command 24 and hailing 34 nodes are asynchronous, a synch word 59 (FIG. 3A) is preferably disposed at the end of the preamble 38 to denote exactly where the payload 40 begins.

FIG. 3A is an overview of discovery search intervals 42 plotted against a discovery burst 36 that is transmitted by a hailing node 34 of FIG. 1. Preferably, the search intervals 42 are seriatim and of equal periods that repeat within the span of one burst preamble 38, allowing the command node's receivers several 'looks' for the preamble 38 within the time span of a single preamble burst 38, further ensuring enough time for the command node to set up one of the receivers to receive the payload 40.

The terminus of each search interval 42 is marked in FIG. 3A as either "no-detect", 42, wherein the command node 24 does not detect a burst preamble 38 (e.g., there is no reception instant), or "detect" 46, wherein the command node 24 senses the presence of a burst preamble 38. Because more than one hailing node 34 may seek entry into the network even within the span of one discovery burst 36, the command node 24 continues to search for additional hailing nodes 34 even when it detects 46 the presence of one hailing node 34. Because the burst preamble 38 and payload 40 preferably use different PN codes, detect 46 as used in this detailed description relates only to the burst preamble 38, not to the burst payload 40. As such, the command node 24 continues to listen even after one hailing node 34 is detected, though not all operable burst receivers may be available if one is locked onto a payload of another hailing node 34 or setting up to investigate another potential burst preamble 38. Preferably and as detailed below, the period of the search interval 42 is less than half of the time period of the burst preamble 38 to allow at least two detect opportunities for a single burst preamble 38. Most preferably, the search interval 42 allow at three detect opportunities in a single burst preamble 38, necessitating that the period of the burst preamble 38 be greater than three times the search interval 42 in order to allow for receiver lock, setup, and carrier phase adjustment.

FIG. 3B, which is not to scale with FIGS. 2A-2B, depicts further detail of timing within the burst preamble 38 where the command 24 and hailing 34 nodes are not synchronized to a common clock. Where a common clock is available, the synchronization features described below may be eliminated. Preferably, the discovery burst 36 runs at a symbol rate of 500 symbols per second with QPSK modulation and direct sequence spreading. The burst preamble 38 is preferably not encoded with forward error correction. The burst preamble 38 preferably is very short and of fixed length, preferably no more than several hundred msec.

Assume for FIG. 3B that a receiver detecting a burst preamble will require $N_{dwell}$ symbols to detect and lock onto the acquisition frequency 54. $T_{RXsetup}$, reference number 55, represents the number of symbols (e.g., sixteen) designated for receiver setup, which permits a link control processor (LCP) of the command node 24 to be notified by a search engine that a potential burst has been located. The LCP will respond by assigning a burst/traffic receiver out of a pool of available receivers to further investigate the potential burst. Several symbols (e.g., seven) are allotted for the newly assigned burst receiver to begin running at the correct frequency and phase ($T_{phase}$, reference number 57) as determined by the hailing node's discovery burst 36. A known symbol pattern in the burst preamble 38 may be used to permit the receiver in the command node 34 to identify its correct phase (e.g., four symbols). In an asynchronous discovery protocol, the burst preamble 38 terminates with a sync sequence or synch word 59 that permits the receiver to unambiguously identify when the burst preamble 38 ends and the burst payload 40 begins. For purposes of description, assume the synch word 59 is a Barker sequence spanning $T_{synch}$ symbols (e.g., thirteen symbols). The payload begins immediately after the sync word 59. When the payload section 40 of the burst 36 begins, the PN code will change to a more secure long-code and the payload data is preferably encoded with forward error control coding.

Preferably, the discovery burst preamble 38 is spun so as to allow command node 24 at least three opportunities or search intervals 42 to detect a single discovery burst 36 with sufficient time to prepare to receive the payload 40 of that same discovery burst. The worst possible timing between search interval 42 and burst preamble 38 has the search interval 42 beginning one dwell time prior to the start of the burst preamble 38 and resulting in a 'no detect' 44. Term this an incomplete search, terminating at reference number 56 of FIG. 3B, and occupying ($N_{dwell}$−1) symbols. The next three search intervals each occupy $N_{dwell}$ symbols and terminate in a first 58, second 60, and third 62 attempt to detect. Assume detect 46 occurs on the third try 62. The remaining time within the burst preamble 38 must be at least $T_{RXsetup}+T_{phase}+T_{synch}$ symbols. The total burst preamble 38 size must therefore be at least ($N_{dwell}$−1)+$3N_{dwell}+T_{RXsetup}+T_{phase}+T_{synch}$ symbols to ensure in all cases three complete detect attempts. To accomplish this within the several hundred msec limit for the burst preamble size noted above (e.g., 87 symbols) leaves the command node 24 about 32 msec (at 500 symbols/sec) for each detect attempt.

To minimize security risk, the preamble 38 carries no substantive data, allows detection while minimizing intercept, and informs as to the payload's presence and perhaps some information regarding its spreading code (where preamble 38 and payload 40 use different spreading codes). Even though every potential hailing node 34 may use the same PN code for the side channels at any given time, the probability of two users "colliding" and destroying each other's burst preamble is low. Due to the autocorrelation properties of properly doped composite codes (explained below), two separate discovery bursts 36 offset in time by more than a chip from one another should both be received by the command node 24 simultaneously without errors.

Longer code sequences create implementation challenges in that they require more memory in both the transmitter and receiver and more computation time and power in the receiver during the detection (autocorrelation) process. To enable a very high probability of successfully detecting any single arbitrary discovery burst preamble 38 of such a short duration, preferably the burst preamble uses a composite code constructed from one or more shorter sub-codes, and preferably doped in a manner that destroys autocorrelation at periodic intervals within the composite code that would otherwise be defined by the manner in which the sub-codes are combined. Further details may be obtained at co-owned U.S. patent application Ser. Nos. 10/915,776, and 10/915,777, each filed on Aug. 10, 2004. Each of those applications are incorporated herein by reference. Constraining the PN code used for the burst preamble 38 to repeat, for example every symbol, significantly reduces the search space to be scanned during those $N_{dwell}$ symbols. Assume such a composite code is of length 100,000 and is doped so that autocorrelation is suppressed everywhere except symbol boundary epochs where the code repeats.

Figure 4:
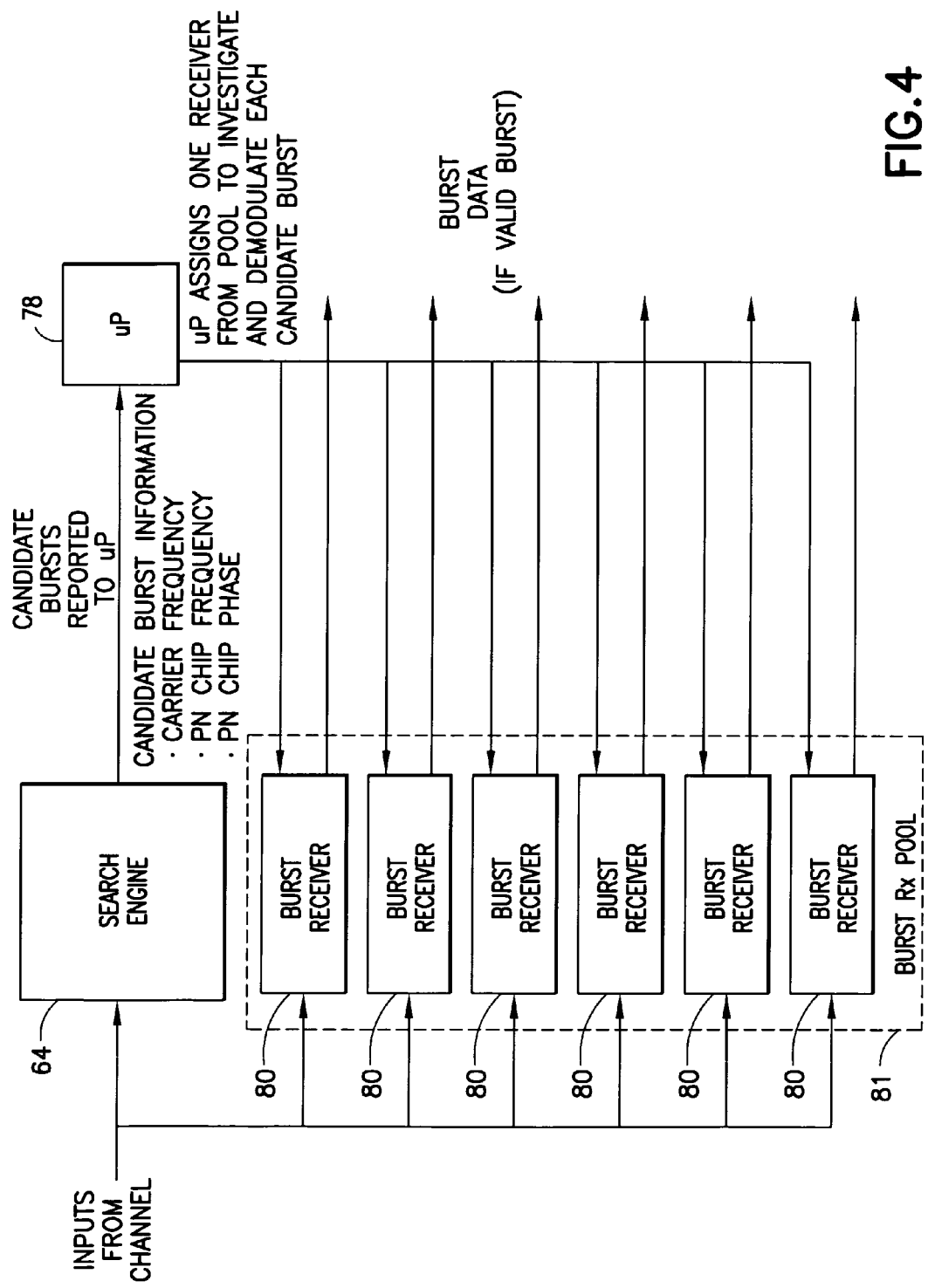
FIG. 4 is a high-level block diagram showing a receiver having a controller directing various burst receivers to investigate and lock onto an individual candidate discovery burst that is reported by the search engine of FIG. 3.

Since offset versions of a properly doped composite PN code do not correlate highly with the matched filter 66, it is possible for any two discovery bursts 36 that are offset in time from one another by more than a chip to be simultaneously received. The search engine of FIG. 4 reports to the LCP processor 78 the chip phase, carrier frequency, and chip frequency of each candidate discovery burst 36. The LCP processor 78 responds by assigning burst/traffic receivers 80 from a pool 81 of available receivers to perform a further investigation of each discovery burst 36. As long as the pool 81 of available receivers 80 is not depleted, there will be an available receiver to further investigate every received discovery burst 36 and extract the data from that burst's payload 40. The number of receivers 80 in the pool 81 may be readily scaled for the estimated extent of the system.

FIG. 5 is a block diagram of a transmitter 66 according to a preferred embodiment of the present invention. A frequency spinner 67 varies a carrier frequency along a frequency ramp as described above, and a constant frequency multiplier 68 provides a constant carrier frequency. Each of these 67, 68 are alternatively coupled to a first switch 69. A first PN code 70 such as the composite PN code made from two or more constituent sub-codes as noted above, and a second PN code such as one that does not repeat in 100 years, are each alternatively coupled to a second switch 72. The first PN code 70 further includes the data sequence described above that informs the receiver as to a reception instant's position within the burst preamble portion 38. The second PN code 71 further includes substantive data carried in the payload portion 40 of the discovery burst 36. Each of the first and second switches 69, 72 are actuated in tandem by a common control 73, which may be a single actuator or a common instruction from a processor that directs individual actuators associated with each switch 69, 72 to operate their respective switch. Each of the switches are coupled to a modulator 74. An output of the modulator 74 is amplified at an amplifier 75 and transmitted by one or more transmit antennas 76.

When the switches are in the position shown in FIG. 5, the burst preamble portion is processed and transmitted as follows. At the modulator, the first PN code and data sequence 70 are modulated onto a carrier frequency that varies according to a ramp (continuous or stepped) as detailed above and with reference to FIGS. 2A-2C. At the end of the preamble portion 38, which may be designated by a synch word added separately (not shown) from the first PN code and sequence 70, the controller 73 flips both switches 69, 72. Now the second PN code with data 71 is coupled to the modulator, where it is modulated onto a carrier wave at a constant carrier frequency. The output of the modulator 74 is amplified 75 and otherwise processed as known in the art to be transmitted via the transmit antenna 76.

Considering that the secure environment described may possibly be compromised by an unwanted party receiving the burst preamble 38, and that the burst preamble 38 has the least secure spreading code (e.g., shortest, higher autocorrelation than that of the burst payload 40), following is a method to increase its security. Using extra transmit power that must be reserved in the link budget in any system design (as detailed below), the hailing node 34 may 'self-jam' the discovery burst preamble 38 as shown graphically in FIG. 6. Assuming a large processing gain in the overall communication system, the hailing node can self-generate electronic 'noise' 90 that is preferably stronger than the burst preamble 38, preferably at least 5 or 10 dB stronger. While this would negligibly impact the ability of the command node 24 to detect and receive the burst preamble 38 as described above, it increased LPI by masking the very existence of the burst preamble 38 to eavesdroppers. It is possible to self-jam using self-generated noise that is at a power level less than the transmit power of the discovery burst preamble, or at a power level substantially the same as the discovery burst. Masking is more effective in minimizing probability of intercept when self-generated noise at least exceeds the transmission power of the substantive burst, and the more it exceeds the more effective the jamming masks.

Clearly, there is a tradeoff of masking the burst preamble 38 in noise 90; such an excess of noise greatly increases the probability of detection even while reducing probability of intercept. However, an eavesdropper in actual possession of a stolen transmitter will in many cases be unable to separate the burst preamble 38 sent by that transmitter from the overpowering noise 90 it also transmits (assuming the noise is at a higher transmit power). Because this self-jamming aspect is expensive in terms of link budget, and because the burst payload 40 preferably uses a much more secure PN code, self-jamming preferably occurs on the burst preamble 38 but not on the burst payload 40.

If self-jamming is used, the level of the jamming should be at least a few decibels above the level of the true signal, unless the hailing node 34 is operating near its power amplifier saturation level. If this is the case, then it will be desirable to dedicate more of the hailing node's power to the true signal and less to the jamming. The true signal should, in general, be transmitted with an amount of power necessary to achieve the "power control set point" at the receiver of the command node 24. The power control set point is defined as the energy level required by the command node, and is known in the art. Note that this is defined in terms of energy rather than power because hailing nodes 34 may send signals at different data rates and the power they must use to satisfy the command node 24 will vary with data rate. The ideal is that every signal will arrive at the command node 24 with the same energy per bit, regardless of rate. This implies that one hailing node transmitting at ten times the rate of another hailing node will need to have his signal arrive at the command node 24 at a 10 dB higher power level. Since it is anticipated that the discovery protocol operate on side channels (apart from traffic channels) at reduced data rates (e.g., on the order of 500 bps), it will generally be the case that the transmitters of hailing nodes will be backed off considerably from their peak level when sending discovery bursts 36. Thus, it is normally the case that the hailing node transmitters will have ample available power to self-jam.

It is noted that the drawings and description presented herein are illustrative of the invention and not exhaustive. While there has been illustrated and described what is at present considered to be preferred and alternative embodiments of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A method to establish communications between a first node and a second node, comprising:

modulating a preamble portion comprising a data sequence known to the second node with a carrier frequency that varies across a range of carrier frequencies that is bounded by Doppler uncertainty threshold;

modulating a payload portion with a constant carrier frequency;

spreading the preamble portion with a first pseudo-random noise (PN) code;

spreading the payload portion with a second pseudo-random noise (PN) code; and transmitting a discovery burst from the first node to the second node, the discovery burst comprising the modulated and spread preamble and payload portions.

2. The method of claim 1, wherein the first pseudo-random noise (PN) code is constructed from at least three constituent sub-codes, each known to the second node.

3. The method of claim 1, wherein the carrier frequency that varies across the range of carrier frequencies varies linearly and spans the range of carrier frequencies at least two times during the preamble portion.

4. The method as in claim 1, wherein the carrier frequency that varies across the range of carrier frequencies varies non-linearly and spans the range of carrier frequencies at least two times during the preamble portion.

5. The method of claim 1 wherein the first node operates with a clock that is asynchronous with the second node.

6. The method of claim 1, wherein the carrier frequency that varies across the range of carrier frequencies spans the range of carrier frequencies at least three times during the preamble portion.

7. A method to establish communications between a first node and a second node, comprising:

receiving at a second node a waveform comprising a preamble portion and a payload portion, the preamble portion comprising a data sequence known to the second node being transmitted with a carrier frequency that varies across a range of carrier frequencies that is bounded by Doppler uncertainty threshold;

relating a value of the data sequence which was detected at the reception at an acquisition frequency that lies within the range of carrier frequencies;

correlating a value of the data sequence which was detected at the reception instant at least with a carrier frequency for the payload portion; and tuning a receiver to the related carrier frequency to receive the payload portion.

8. The method of claim 1 wherein the preamble portion is characterized by a lack of forward error correction.

9. The method of claim 1 wherein the preamble portion is transmitted simultaneously with noise purposefully generated by the first node.

10. The method of claim 9 wherein the payload is not transmitted simultaneously with noise purposefully generated by the first node.

11. The method of claim 7, wherein there are at least two reception instances at which the preamble portion is detected at the acquisition frequency.

12. The method of claim 11, wherein the data sequence comprises a digital count and the value of the data sequence which was detected at the reception instance corresponds to the carrier frequency for the payload portion which is a constant frequency.

13. A transmitter comprising:

a first switch alternately coupling to a variable frequency generator and a substantially constant frequency generator;

a second switch alternatively coupled to a first pseudo-random noise (PN) code input and a second pseudo-random noise (PN) code input;

a controller for operating said first and second switches simultaneously;

a modulator having an input coupled to an output of each of said first and second switches; and at least one transmit antenna having an input coupled to an output of the modulator.

14. The transmitter of claim 13 wherein the first pseudo-random noise (PN) code input is for providing a first PN code and a data sequence, and the second pseudo-random noise (PN) code input is for providing a second PN code and user data.

15. The transmitter of claim 13 wherein the variable frequency generator provides a carrier frequency that varies linearly in a range of carrier frequencies.

16. The transmitter of claim 13 wherein the variable frequency generator provides a carrier frequency that varies non-linearly in a range of carrier frequencies.

17. The transmitter of claim 13 wherein the variable frequency generator provides a carrier frequency that varies in a range of carrier frequencies so as to cross a particular frequency within the range at least twice while the first switch is continuously coupled to the variable frequency generator.

18. A transmitter for sending a discovery burst, comprising:

means for spreading a data sequence of a burst preamble with a first pseudo-random noise (PN) code, wherein each and every point of the data sequence is indicative of a unique position within the preamble;

means for applying a variable frequency profile to the burst preamble, the frequency profile bounded by Doppler uncertainty thresholds;

means for applying a constant frequency to a burst payload that is spread with a second pseudo-random noise (PN) code;

means for transmitting the burst preamble at the variable frequency and the burst payload at the constant frequency within a single discovery burst.

19. The transmitter of claim 18, wherein the data sequence comprises a sequential digital count.

20. The transmitter of claim 18, wherein the means for spreading comprises at least one spreader configured to spread the burst preamble with the first pseudo-random noise (PN) code and to spread the burst payload with a second pseudo-random (PN) code.

* * * * *